March 30, 1954

S. WIXSON ET AL 2,673,499

AXLE LOCKING DEVICE FOR OSCILLATABLE
WHEEL AND AXLE ASSEMBLY.

Filed May 19, 1952

INVENTORS
Sandford Wixson
Edgar Von Bolhar
BY Pierce, Scheffler & Parker
ATTORNEYS

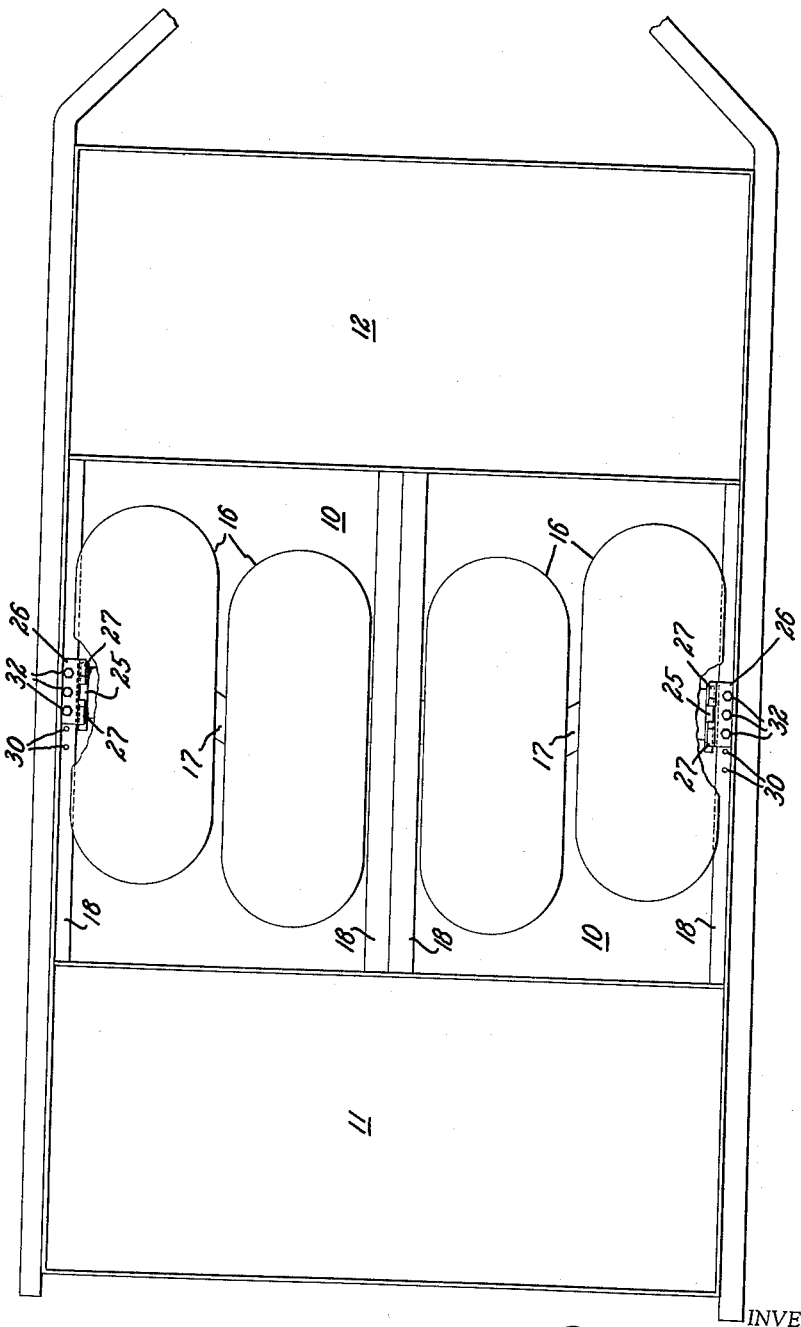

March 30, 1954 S. WIXSON ET AL 2,673,499
AXLE LOCKING DEVICE FOR OSCILLATABLE
WHEEL AND AXLE ASSEMBLY
Filed May 19, 1952 3 Sheets-Sheet 3
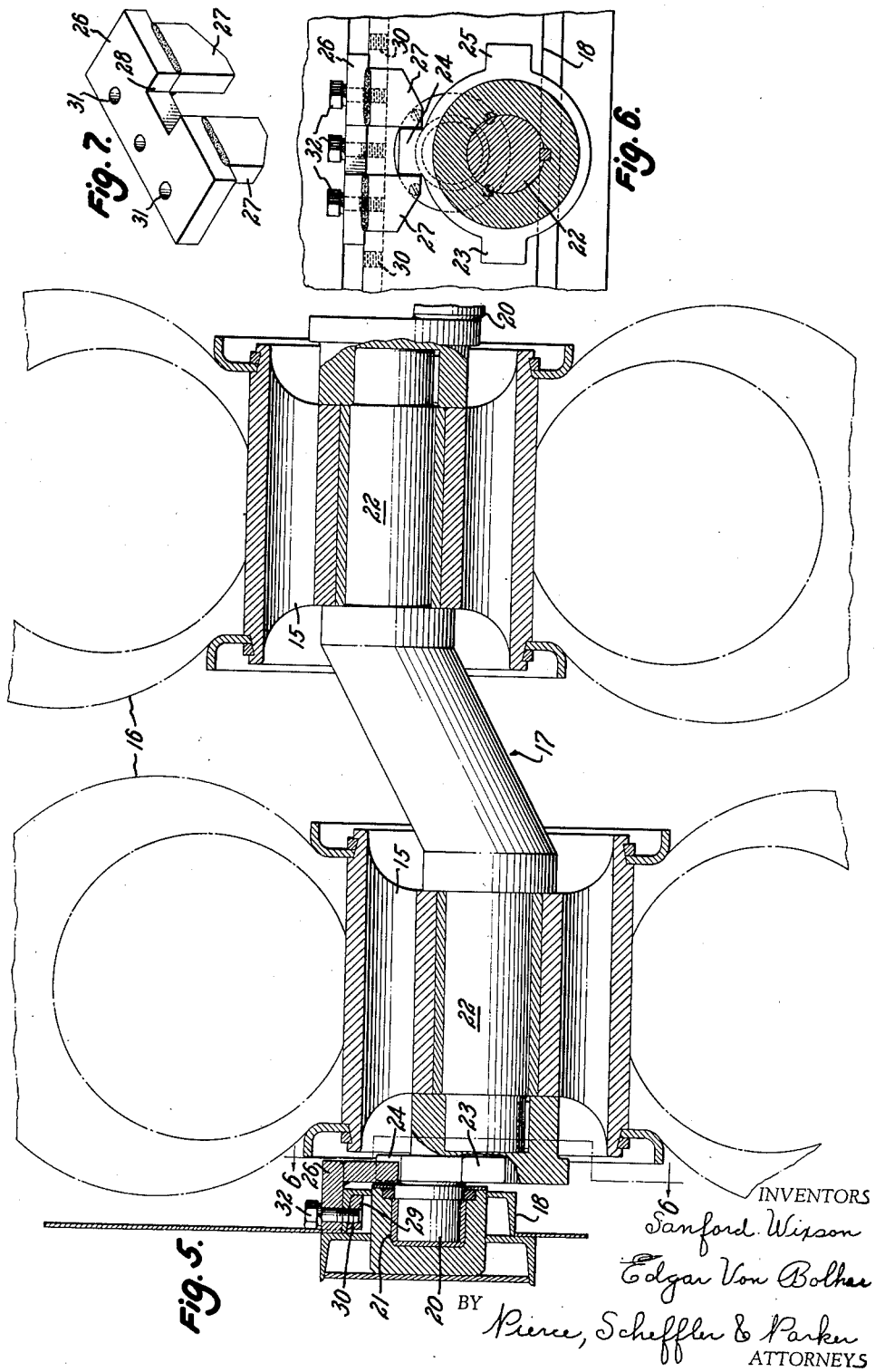
INVENTORS
Sanford Wixson
Edgar Von Bolhar
BY Pierce, Scheffler & Parker
ATTORNEYS Patented Mar. 30, 1954

2,673,499

UNITED STATES PATENT OFFICE 2,673,499

AXLE LOCKING DEVICE FOR OSCILLATABLE WHEEL AND AXLE ASSEMBLY

Sanford Wixson and Edgar Joseph von Bolhar, San Francisco, Calif., assignors to Super-Compactors, Inc., Sacramento, Calif., a corporation of California Application May 19, 1952, Serial No. 288,600

6 Claims. (Cl. 94—50)

The present invention relates to an oscillatory wheel and axle assembly and more particularly to an assembly comprising an axle journalled in end bearings located coaxial with the axle axis, the axle being provided with pairs of high pressure rubber tired wheel mounting bearings, the bearings of each pair being located on opposite sides of the axle axis and equally eccentric thereto whereby the wheels are free to oscillate about the axle axis and thereby share equally in supporting the load carried by the axle.

Axle mountings of this general type are particularly useful in roller type earth compaction apparatus and which provides high intensity mass loading for superior compaction of fills, sub-grades in cut sections, sealing of cracks in asphalt paved surfaces, etc.

These compactors having gross weights up to 200 tons carried by two axially aligned axle sections each mounting a pair of rubber tired wheels may thus impose a load of up to 50 tons on each wheel and tire. When the compactor is rolled across an irregular surface the wheels may become burdened with loads even greater than 50 tons but overloading of individual tires is reduced by the oscillating coupling which ties the wheels of each pair together while allowing sufficient flexibility for each pair to adjust itself to surface irregularities. Obviously without this flexibility, the added shock and stress imposed upon the tires when the apparatus is drawn across an uneven surface would result in excessive wear, depreciation and failure of the expensive, specially-made tires which are necessary. Moreover the high intensity compaction pattern normally achieved deep in the sub soil by virtue of the close wheel spacing is dependent upon wheel pair flexibility.

While the wheels of each pair are normally flexible so as to better distribute the load on uneven ground, it has been found desirable that means be provided whereby the axle may be locked in alternative positions with respect to the frame. In one such position only one wheel of each pair carries the load, and in the other position, both wheels of each pair are secured at the same level. The first of these two alternative, fixed positions is used when a tire requires repair, or when the compactor is hauled without ballast loading from one job to another, or for purposes of test when rolling existing pavement or new grade or sub-grade under load to determine wheel load capacity of an existing pavement or a base before laying the final pavement surface. This is most important as regards construction of landing strips for airports where the wheel loading for commercial and military aircraft now in use runs very high. The other axle position, namely with both wheels locked at the same level is advantageous for the final compaction phase after substantially all surface irregularities have been rolled out.

It is therefore the principal object of this invention to provide an improved arrangement whereby the normally oscillatable axle may be secured against oscillation in alternative positions so as to either concentrate the load on less than the normal number of wheels which otherwise divide the load substantially equally between them, or produce the same effect as would be the case were all wheels to be carried on bearings coaxial with the axle axis.

A more specific object is to provide an axle lock comprising a slotted plate adapted to be secured in place on the frame adjacent the axle in such position that the slotted portion thereof engages a radially extending lug on the axle thus locking the latter against oscillation about its axis. A further specific object is to provide an axle lock wherein the locking plate is provided with a lug engaging slot and the axle is provided with a pair of peripherally spaced lugs. One end of the slot is adapted to engage one lug to hold the axle in such an angular position that one of the two eccentrically mounted wheels is raised higher than the other; the other end of the slot when engaged with its mating lug holds the axle in such angular position that both wheels are fixed at the same level.

In the accompanying drawings which illustrate a preferred embodiment of the invention:

Fig. 1a is a top plan view of the roller compactor shown in Fig. 1 but with the axles locked in such position that both wheels on each axle are disposed at the same level.

Fig. 5 is a vertical longitudinal section through one of the axles drawn to an enlarged scale;

Fig. 6 is a transverse section on line 6—6 of Fig. 5; and

Fig. 7 is a view in perspective of the locking plate which cooperates with the locking lugs on the axle.

Figure 1:
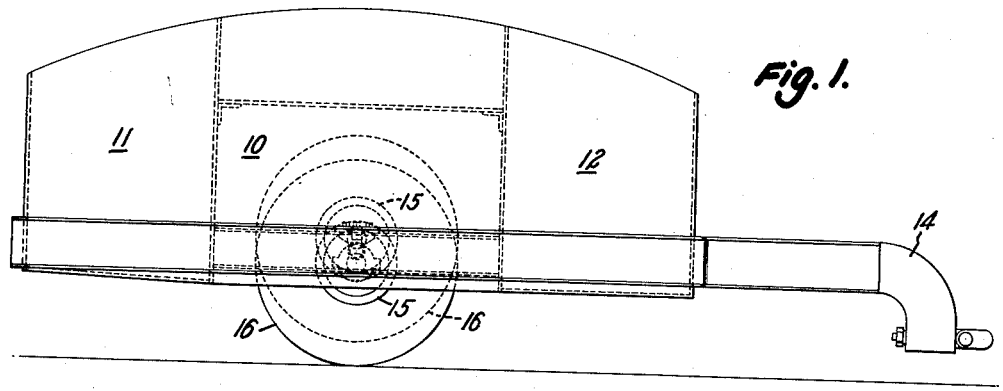
Fig. 1 is a side elevation of a roller compactor provided with a pair of normally oscillatable wheel and axle assemblies but with the axles locked in such angular position that the outer wheel on each axle is locked in the "down" position thus raising the inner wheel out of contact with the ground.

With reference now to the drawings, it will be seen that the roller compactor has a structural frame providing a wheel housing compartment 10 intermediate two ballast compartments 11 and 12, a drawbar assembly 14 being fastened to the frame whereby the latter is adapted to be towed by a prime mover (not illustrated).

The design of the structural frame comprises no part of the present invention and may be modified in any manner dictated by convenience and necessity. However, the invention finds its maximum utility in a rigid unitary structure suitable for ballast carrying and which is designed for the close spacing of a plurality of wheels which are in general, approximately but not exactly coaxially aligned.

The structural frame is supported on four wheels 15 equipped with special, high pressure pneumatic tires 16. These tires are adapted to carry pressures up to 150 pounds per square inch and have as many as 32 plys. The four wheels 15 are carried by two axles 17, each of the wheel axles being carried at its ends by longitudinally extending channel members 18 constituting parts of the roller compactor frame.

A satisfactory arrangement for the wheel and axle mountings is illustrated more in detail in Fig. 5 by reference to which it will be seen that each axle 17 has coaxially aligned end journal portions 20 journalled for oscillatory motion in bearings 21 mounted in apertures through the web portions of the channels 18.

Each axle is also formed with two wheel mounting portions 22 intermediate the end journal portions, the wheel mounting portions being substantially equally and substantially oppositely eccentric to the end journal portions, e. g. equally and oppositely offset from the longitudinal axis of the axle.

The wheels 15 are mounted by means of bearing assemblies for rotation about the wheel mounting portions 22, the rotation of the wheels therefore being independent of the oscillatory movement of the axles 17 in their bearings 21. Accordingly each axle and its pair of wheels comprise a unitary oscillatory assembly which is capable, within the limit of total eccentricity of the wheel mounting portions, of automatically compensating for irregularities of the surface on which the wheels rest and therefore capable of automatically distributing evenly between the wheels whatever load is applied to the oscillatable assembly.

The construction so far described is not considered to be novel with the present applicants but rather has been included as background for the subject matter of the present invention which is predicated upon the structure now to be described by which the axles may be locked against oscillation in such alternative manners as to concentrate the load of each axle on one of the two wheels which it carries or alternatively to set both wheels at the same elevation. As indicated in the introduction, such axle locking means will prove advantageous in a number of situations such as where the compactor is to be moved with a flat tire, or is to cover long distances on highways either empty or with light load. Further, when a compactor is to be employed as a test loading apparatus, the load may be placed on the two outside wheels, to duplicate the effect produced by heavy pneumatic tired wheel loads. The axles may also be locked in the position where all four wheels are fixed at the same elevation with either the inner wheel of each pair trailing the outer wheel or vice versa, this being a condition useful for rolling asphaltic pavements to seal cracks and smooth them thereby increasing their life. This type of operation is also useful for final rolling of surfaces to be paved.

The improved axle locking device according to the invention is illustrated most clearly in Figs. 5–7 from which it will be observed that the outer wheel mounting portion 22 of each axle 17 near the outer end journal 20 of the axle is provided with three lugs 23–25 spaced 90° apart around the upper half of the periphery of the outer wheel mounting portion 22 when the latter occupies its lowermost position as seen in Fig. 6. A locking plate 26 having a pair of spaced legs 27 defining a retaining slot 28 cooperative with the shaft lugs and of the same width is arranged to be detachably secured to the upper face of the channel 18. To this end, the under face of the upper flange of channel 18 has welded thereto a plate 29 to increase the thickness in the vicinity of the place of attachment and a plurality of longitudinally spaced threaded holes 30 are provided in the flange and plate. These holes are adapted to register with correspondingly spaced holes 31 in the locking plate 26, and cap screws 32 which pass through the holes 31 into the threaded holes 30 thus serve to attach the plate 26 to the channel 18. It will be seen that there are five of the holes 30 and three of the holes 31. This permits the locking plate 26 to be attached in one of three possible positions on the channel.

Figure 2:
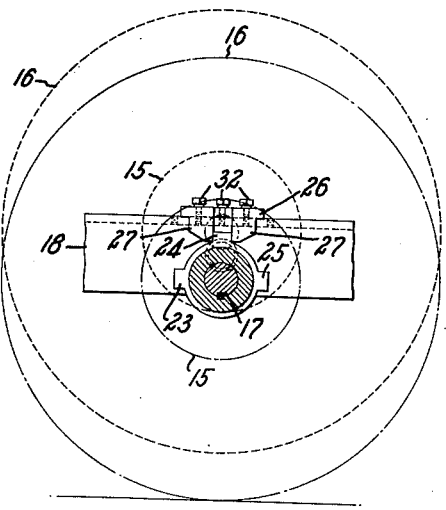
Fig. 2 is a vertical transverse section through the axle adjacent the locking device, the latter being in the same position as shown in Fig. 1.

In the "central" position shown in Fig. 2 the cap screws 32 are threaded into the three inner holes 30, the plate 26 is attached to the flange with the legs 27 facing downwardly, and the center lug 24 on the axle is engaged in the outer end portion of slot 28. Engagement of lug 24 in the slot 22 occurs when the outermost wheel mounting portion 22 of the axle occupies its lowermost position and the innermost wheel mounting portion 22 occupies its uppermost position thus securing the axle in such angular position that the outer wheel of each axle carries the entire axle load, as indicated in Fig. 2, the inner wheel being raised sufficiently to clear the ground.

Figure 4:
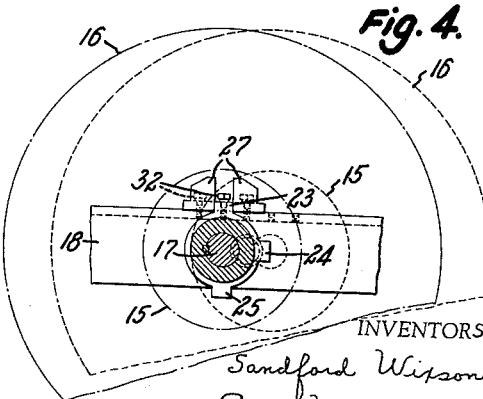

If it is desired to lock the axles in such position that the wheels of each pair are located at the same elevation, the locking plate 26 is shifted to either of its two other positions. If attached to the channel in the position shown in Fig. 4 both wheels will be located at the same elevation and the inner wheel of the pair will lead the outer wheel. Note that with this arrangement, plate 26 is inverted and lug 23 on the axle is engaged with the opposite end of the slot formed by the spaced legs 27 when the two wheel mounting portions 22 of the axle occupy like positions as regards their height above the ground line.

Figure 3:
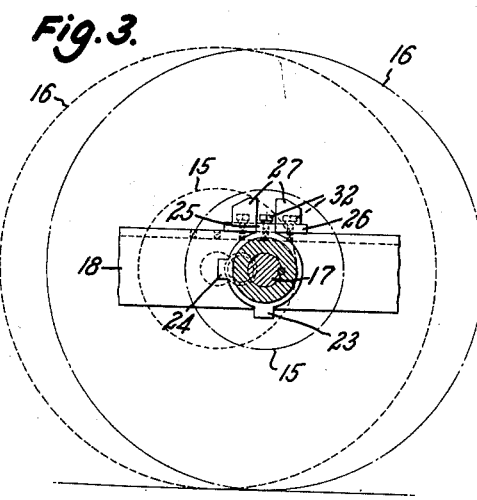
Figs. 3 and 4 are views similar to Fig. 2 but with the locking device in such position that both wheels of each axle are locked at the same level.

If plate 26 is attached, inverted, to channel 18 in the position shown in Fig. 3, both wheels of each pair will also be located at the same elevation but the outer wheel of the pair will lead the inner one. In this arrangement the slot 28 engages the lug 25 on the axle.

We claim:

1. In a roller compactor the combination comprising a frame, at least two pairs of axially aligned journal bearings mounted in said frame in horizontal alignment, a normally oscillatable axle assembly journalled in each of said pairs of journal bearings, each said axle assembly comprising a rigid axle having coaxial end journals each freely oscillatable in the respective journal bearings of each pair, two wheel mounting portions disposed between and substantially equally and oppositely eccentrically disposed with respect to said coaxial end journals and a pneumatically tired wheel journalled on each of said wheel mounting portions, and means individual to each said axle assembly for locking the assembly against oscillation, each said locking means comprising a locking plate having a lug engaging portion, means for removably securing said locking plate on said frame, and a lug on said axle received by the lug engaging portion on said locking plate thereby to lock said axle against movement about its axis.

2. The invention as defined in claim 1 wherein said locking plate engages said lug when one of said wheel mounting portions occupies its lowermost position and the other its uppermost position thus transferring the entire load on the axle to the lowermost one of said wheel mounting portions.

3. The invention as defined in claim 1 wherein said locking plate engages said lug when the two wheel mounting portions are disposed at the same level.

4. In a roller compactor the combination comprising a frame, at least two pairs of axially aligned journal bearings mounted in said frame in horizontal alignment, a normally oscillatable axle assembly journalled in each of said pairs of journal bearings, each said axle assembly comprising a rigid axle having coaxial end journals each freely oscillatable in the respective journal bearings of each pair, two wheel mounting portions disposed between and substantially equally and oppositely eccentrically disposed with respect to said coaxial end journals and a pneumatically tired wheel journalled on each of said wheel mounting portions, and means individual to each said axle assembly for locking the assembly against oscillation, each said locking means comprising a pair of circumferentially spaced lugs on the eccentrically located wheel portion of said axle, a locking plate having a lug engaging portion, and means for removably securing said locking plate to said frame such that the lug engaging portion thereof is selectively engaged with one or the other of said lugs to lock said axle against movement about its axis, engagement between said lug engaging portion and one of said lugs locking said axle in such position that one of the wheel mounting portions thereof is located at a higher level than the other whereby the lower-most one assumes the entire axle load, and engagement between said lug engaging portion and the other of said lugs locking said axle in such position that both of the wheel mounting portions thereof are located at the same level.

5. In a roller compactor the combination comprising a frame, at least two pairs of axially aligned journal bearings mounted in said frame in horizontal alignment, a normally oscillatable axle assembly journalled in each of said pairs of journal bearings, each said axle assembly comprising a rigid axle having coaxial end journals each freely oscillatable in the respective journal bearings of each pair, two wheel mounting portions disposed between and substantially equally and oppositely eccentrically disposed with respect to said coaxial end journals and a pneumatically tired wheel journalled on each of said wheel mounting portions, and means individual to each said axle assembly for locking the assembly against oscillation, each said locking means comprising three circumferentially spaced lugs on the eccentrically located wheel portion of said axle, a locking plate having a lug engaging portion, and means for removably securing said locking plate to said frame such that the lug engaging portion thereof is selectively engaged with said lugs to lock said axle against movement about its axis, engagement between said lug engaging portion and the middle one of said lugs locking said axle in such position that one of the wheel mounting portions thereof is located at a higher level than the other whereby the lowermost one assumes the entire axle load, engagement between said lug engaging portion and one of the two remaining lugs locking said axle in such position that both of the wheel mounting portions thereof are located at the same level but with the inner wheel mounting portion located in advance of the outer wheel mounting portion, and engagement between said lug engaging portion and the other of the two remaining lugs locking said axle in such position that both of the wheel mounting portions thereof are located at the same level but with the outer wheel mounting portion located in advance of the inner wheel mounting portion.

6. The combination with a normally oscillatable axle assembly comprising a rigid axle having coaxial end journals each freely oscillatable in journal bearings provided in a frame therefor, two wheel mounting portions disposed between and substantially equally and oppositely eccentrically disposed with respect to said coaxial end journals and a wheel journalled on each of said wheel mounting portions, of means for locking said axle against oscillation, said locking means comprising a locking plate having a lug engaging portion, a lug on said axle and means for attaching said plate to said frame with the lug engaging portion engaged with the lug on said axle thereby to lock said axle against movement about its axis.

SANFORD WIXSON.
EDGAR JOSEPH von BOLHAR.

References Cited in the file of this patent
UNITED STATES PATENTS

| Number | Name | Date |
|---|---|---|
| 2,239,849 | Judd | Apr. 29, 1941 |
| 2,286,576 | Ronning | June 16, 1942 |
| 2,391,948 | Couse | Jan. 1, 1946 |
| 2,612,387 | Ronning | Sept. 30, 1952 |